Dec. 22, 1936.   M. E. STREEN   2,065,354
FOOT PEDAL ORGANIZATION FOR MOTOR VEHICLES
Filed May 7, 1936
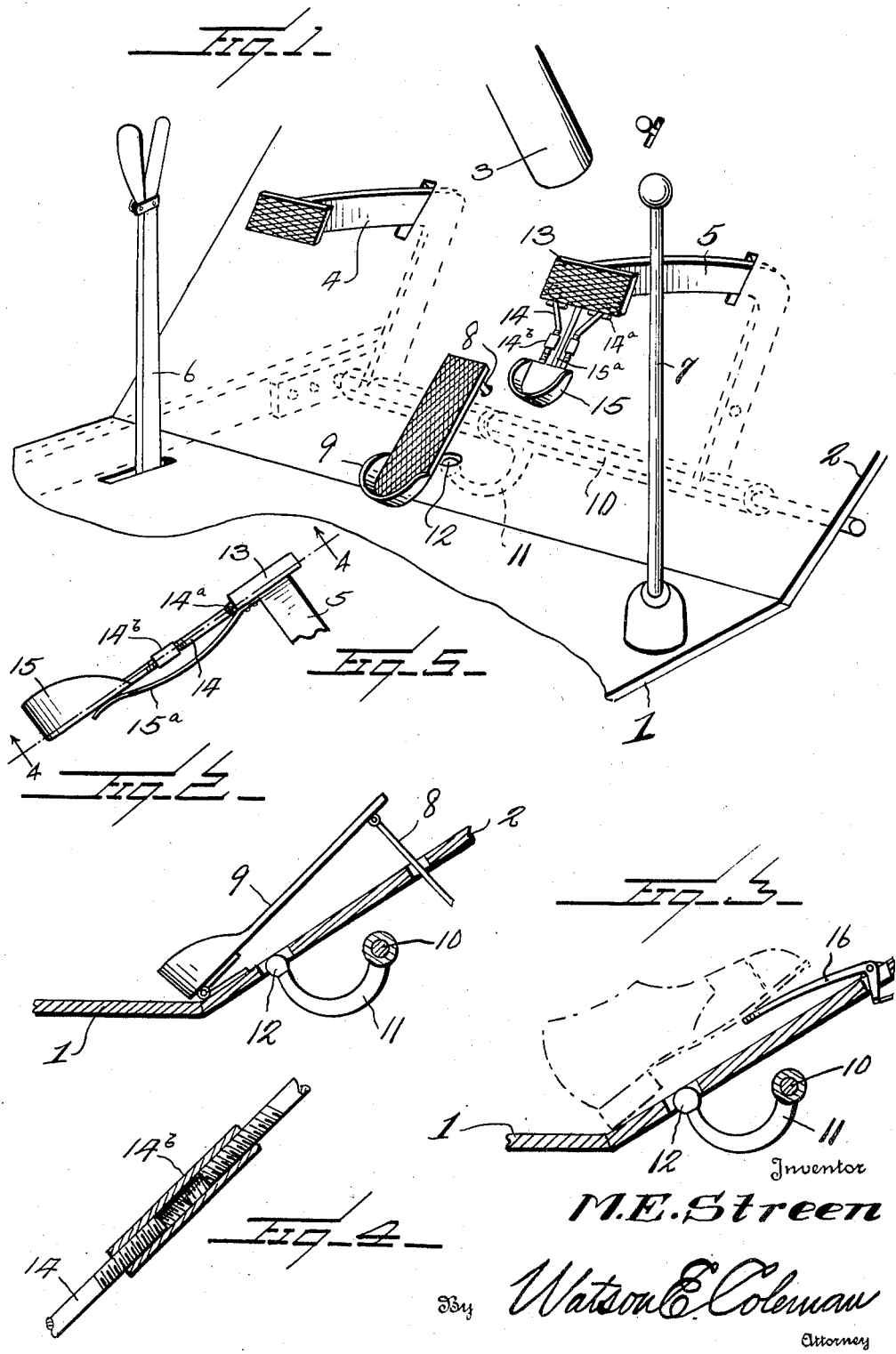

Patented Dec. 22, 1936

2,065,354

UNITED STATES PATENT OFFICE 2,065,354

FOOT PEDAL ORGANIZATION FOR MOTOR VEHICLES

Morris E. Streen, Newark, N. J.

Application May 7, 1936, Serial No. 78,501

6 Claims. (Cl. 192—3)

This invention relates to the class of motor vehicles and pertains particularly to improvements in the structure and arrangement of certain foot operated levers or pedals of the same.

In the present method of operating motor vehicles, it is customary to place the vehicle clutch pedal and foot brake pedal side by side with the accelerator pedal to the right of the brake pedal and to operate the accelerator pedal with the right foot while the left foot normally rests upon the floor of the machine. As a result of certain tests recently made, it has been learned that the sudden development of a situation in front of a moving motor vehicle, which indicates to the driver of the vehicle the necessity for quick action in order to avoid an accident, results in a certain reflex action in the legs of the vehicle driver, causing him to thrust both feet forward against the floorboard of the motor vehicle, this action having been termed by the investigator of this condition, the "extensor thrust". From this, it will be obvious that the development of such a situation resulting in this "extensor thrust" will cause an acceleration of the vehicle engine because of the normal location of the driver's right foot on the accelerator pedal, and thus probably cause an accident which might otherwise be avoided.

It has also been determined by investigation that where a vehicle operator reacts properly to a suddenly developed state of affairs requiring a prompt checking of the motor vehicle's advance, there is a lapse of time between the reception by the brain of the driver of the knowledge of the necessity of checking the vehicle's movement and the actual lifting of the foot from the accelerator pedal to the brake pedal, in which the vehicle continues to move forward practically out of control. This so-called "reaction time" varies from an average of six-tenths second up to nine-tenths second and since, at the rate of fifty miles per hour, the motor vehicle moves approximately seven and one-half feet per tenth second, it will be seen that under normal driving conditions, the car moves from forty-five to sixty-seven feet, before any braking power is applied.

The present invention has for its primary object to provide a construction and arrangement of brake and accelerator pedals of a motor vehicle whereby it is possible for the operator of the vehicle to keep his right foot at all times against the brake pedal so that the development of a situation necessitating the quick application of the brake pedal can be more quickly met to check the speed of the vehicle because of the fact that the operator will already have his foot in place upon the pedal and will not be required to lift it from one position to another.

Another object of the invention is to provide a construction and arrangement of brake and accelerator pedals whereby the foregoing object is attained and the vehicle operator is able to control the acceleration of the car with his left foot, thus leaving the right foot for use entirely upon the brake pedal.

Still another object of the invention is to provide a means whereby the danger arising from the "extensor thrust" reflex action will not only be avoided but will be made use of to effect the quick application of the vehicle brake and the simultaneous movement of the accelerator pedal operating foot away from the accelerator pedal.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

Figure 1 is a view in perspective showing the disposition of the several foot operated levers of a motor vehicle in accordance with the present invention;

Figure 2 is a view illustrating the mechanism actuated by the foot brake lever for effecting the deceleration of the vehicle engine;

Figure 3 is a view illustrating a modified form of the structure shown in Figure 2;

Figure 4 is a sectional view on the line 4—4 of Figure 5;

Figure 5 is a view in side elevation of the foot brake pedal showing the method of attaching the heel support thereto.

Referring to the drawing wherein like numerals designate corresponding parts throughout the several views, the numeral 1 indicates the floorboard of a motor vehicle at the forward edge of which is the upwardly inclined portion 2 through which the steering shaft 3 and the usual foot pedal operated levers 4 and 5 extend. The lever 4 represents the usual motor vehicle clutch lever which is disposed at the usual position to the left of the steering shaft 3 while the lever 5 represents the usual foot brake lever which is normally at the right of the steering shaft. The hand brake lever is indicated by the numeral 6 and is disposed in the present invention and in accordance with the construction practice of some motor vehicle manufacturers, at the left of the driver and of the clutch pedal, while the gear shift lever, which is indicated by the numeral 7, is disposed in its usual position at the longitudinal center of the car and to the right of the driver.

In carrying out the present invention, the foot brake lever 5 is disposed further to the right than in the usual car construction so that the area between the foot brake lever and the steering column is increased. The accelerator pedal which is indicated generally by the numeral 8 is located between the clutch and foot brake levers and preferably closer to the foot brake lever, between the same and the steering column, and disposed behind and in spaced relation with the accelerator pedal is a heel rest 9 for the support of the foot which is applied to the pedal 8.

The numeral 10 indicates the tubular shaft which is rockably supported for movement on an axis extending transversely of the floor board and to which is attached the foot brake lever 5. This represents diagrammatically the usual manner in which this lever and the clutch lever are mounted, the associate parts for transmitting motion to the brakes and clutch mechanism by these levers being omitted. This shaft has at the end nearest the accelerator pedal 8, the arcuate arm 11 which terminates in a head 12 which is disposed within the car, the arm 11 adjacent the head passing through a suitable opening in the car floorboard so that the head will be disposed in the area lying between the pedal 8 and the heel rest 9.

The foot brake pedal 13, which is supported upon the upper end of the lever 5, has pivotally attached to its lower edge the longitudinally adjustable arms 14, the pivotal connection of these arms being indicated by the numeral 14ᵃ while the means whereby the adjustment is made is indicated by the numeral 14ᵇ and represents sleeves connecting the two parts of which each arm is made up. These longitudinally adjustable arms 14 have rigidly secured to the ends remote from the pedal 13, the heel rest 15. Secured to the underside of the pedal 13 is a spring 15ᵃ which is relatively stiff and extends downwardly to a point beneath the heel rest, as shown in Figure 5, to normally support the heel rest in the plane of the pedal but, as the lower end of the spring is in slidable contact with the heel rest, it will be obvious that the rest will be permitted downward swinging movement under the application of pressure by the heel. By making the arms 14 adjustable, the distance between the heel support 15 and the pedal may be varied as required.

While it is preferred that an accelerator pedal of the plate type illustrated in Figure 1 be employed so that the head 12 of the foot lifting lever 11 will butt against the underface of the plate instead of the shoe of the operator, it will, of course, be understood that the invention is not to be limited to the use of a foot accelerator pedal of this character for the reason that the device may be used upon cars having other types of pedals such, for example, as that illustrated in Figure 3, where the accelerator pedal is short and is pivoted at a point above the operator's foot instead of below the foot adjacent the heel thereof. In this figure, the accelerator pedal is indicated generally by the numeral 16, and as is shown, the head portion of the foot lifting arm 11 comes up beneath the instep of the foot. The same action would be obtained if the accelerator 16 were of the type comprising a straight post running through the floorboard and having a head upon its upper end.

From the foregoing, it will be readily apparent that in the use of the mechanism illustrated and described, the operator of the motor vehicle will use his left foot for controlling the clutch in the usual manner and the right foot for actuating the accelerator pedal 8 while getting the engine started and while accelerating the car through the several gear shifting stages. After the car transmission mechanism has been placed in the third or high speed stage, the operator will then shift both feet to the right so that the left foot replaces the right in controlling the accelerator pedal and the right foot will be placed upon the foot brake pedal 13 with the heel thereof resting in the support 15. With the feet in this position, it will be readily apparent that should a situation develop requiring quick action on the part of the operator in applying the brake, the right foot, which is always used to apply the foot brake of the motor vehicle, will be already in place so that no time will be lost in lifting the foot from one position to place it upon the brake pedal as is necessary at the present time in the operation of motor vehicles.

In addition, it will be readily apparent that should the emergency situation be such as to startle the car operator so as to produce the "extensor thrust" reflex action previously described, the sudden pushing forward of both feet in the unconscious effort to brace the body against an impending shock will have the desirable result of pushing down the foot brake lever and at the same time pushing up the accelerator pedal or the foot in contact therewith, so that instead of increasing the speed of the engine and failing to operate the foot brake as would be the case if the described reflex action occurred in the operation of the ordinary motor vehicle, the reflex action will cause the operator to apply the brake and decelerate the engine unconsciously. While, of course, this will leave the engine clutch engaged so that the sudden application of the foot brake will stall the engine, this is immaterial in an emergency situation and is infinitely preferable to having a collision even though it may be of a minor character.

What is claimed is:—

1. In a motor vehicle foot pedal assembly, the reorganization of the clutch, foot pedal and accelerator pedals whereby the accelerator pedal is disposed between the clutch and foot brake pedals facilitating the use of the left and right feet, respectively, of a vehicle operator in actuating the accelerator and brake pedals, and a rigid element rigidly joined to the brake pedal by means of which the application of the brake pedal will compel the release of applied pressure to the accelerator pedal.

2. In a motor vehicle, the combination of a foot brake pedal and an accelerator pedal disposed to the left thereof, and a non-yielding means actuated by the foot brake pedal when it is shifted to brake applied position whereby the releasing of the accelerator pedal for movement to inoperative position is effected.

3. In a motor vehicle, a foot brake pedal, an accelerator pedal disposed at the left of the foot brake pedal, an arm arranged to have an end disposed in the area lying beneath a vehicle operator's foot while the latter is on the accelerator pedal, and means coupling the arm and the foot brake pedal whereby the said arm end will rise beneath the foot as the brake pedal is depressed.

4. In a motor vehicle, a foot brake pedal, an accelerator pedal disposed at the left of the foot brake pedal, a shaft supported for oscillation adjacent the foot brake pedal and connected therewith whereby it will be oscillated upon the actuation of the foot brake pedal, and an arm rigid with said shaft and having an end directed upwardly and adjacent the accelerator pedal whereby it will be raised beneath an operator's foot when the foot brake pedal is depressed.

5. In a motor vehicle, a foot brake pedal, an accelerator pedal disposed at the left of the foot brake pedal, a shaft supported for oscillation adjacent the foot brake pedal and connected therewith whereby it will be oscillated upon the actuation of the foot brake pedal, and an arm rigid with said shaft and having an end directed upwardly and adjacent the accelerator pedal whereby it will be raised beneath and toward an operator's foot when the foot brake pedal is depressed.

6. In a motor vehicle including a foot brake pedal, a clutch pedal and an accelerator pedal, a shaft, a sleeve associated with the clutch pedal, a sleeve associated with the foot brake pedal, said sleeves being oscillatably mounted upon the shaft, and an arcuate arm rigidly secured to the sleeve which is joined to the foot brake pedal and arranged to have its free end project upwardly beneath the accelerator pedal whereby actuation of the foot brake pedal will effect oscillation of the arm to raise the accelerator pedal.

MORRIS E. STREEN.